Sept. 19, 1967 T. J. B. HANNOM 3,343,148

TRANSDUCER POSITIONING CIRCUIT

Filed April 8, 1963

INVENTOR
THOMAS J. B. HANNOM

BY Edward M. Farrell

ATTORNEY 3,343,148
Patented Sept. 19, 1967

3,343,148

TRANSDUCER POSITIONING CIRCUIT

Thomas J. B. Hannom, Drexel Hill, Pa., assignor to Sperry Rand Corporation, New York, N.Y., a corporation of Delaware Filed Apr. 8, 1963, Ser. No. 271,176
10 Claims. (Cl. 340—174.1)

This invention relates to signal translating circuits, and more particularly to circuits for translating amplitude modulated signals into pulse width modulated signals.

Circuits involving the conversion of amplitude modulated signals into corresponding pulse width modulated signals are well known. Some such circuits have involved saw tooth signals which, when combined with amplitude modulated signals, have been used to produce output signals corresponding in width to the amplitude modulated signals.

While such circuits have been useful in many applications, they are often not suitable for certain systems. Some such systems, in which conventional conversion circuits used heretofore have been unsuitable, involve, for example, positioning systems where elements must be moved in either of two directions, in accordance with the polarity and amplitude of applied signals.

It is an object of this invention to provide a novel circuit for converting amplitude modulated signals into corresponding pulse width modulated signals.

It is a further object of this invention to provide a novel conversion circuit for use in a mechanical positioning system wherein an element must be moved in either of two directions.

In accordance with the present invention, a square wave signal is applied to an integrator circuit to produce a substantially triangular shaped signal or a signal having substantially equal rise and fall slopes. The triangular shaped signal is applied to a zero cross detector circuit to produce a rectangular output signal. The rectangular signal is used to move a positioning element a predetermined distance and direction. The triangular signal is normally biased at zero reference potential having equal positive and negative portions. The bias level of the triangular signal is variable in either a positive or negative direction. When the bias reference of the triangular signal is varied, the zero cross detector circuit produces a rectangular output signal variable in width in accordance with the applied amplitude modulated signal. The invention may be considered as a switching amplifier in which a relatively small signal is used to control a large signal to physically move an element.

Other objects and advantages of the present invention will be applied and suggest themselves to those skilled in the art, from a reading of the following specification and claims in connection with the accompanying drawing, in which:

Figures 1, 2:
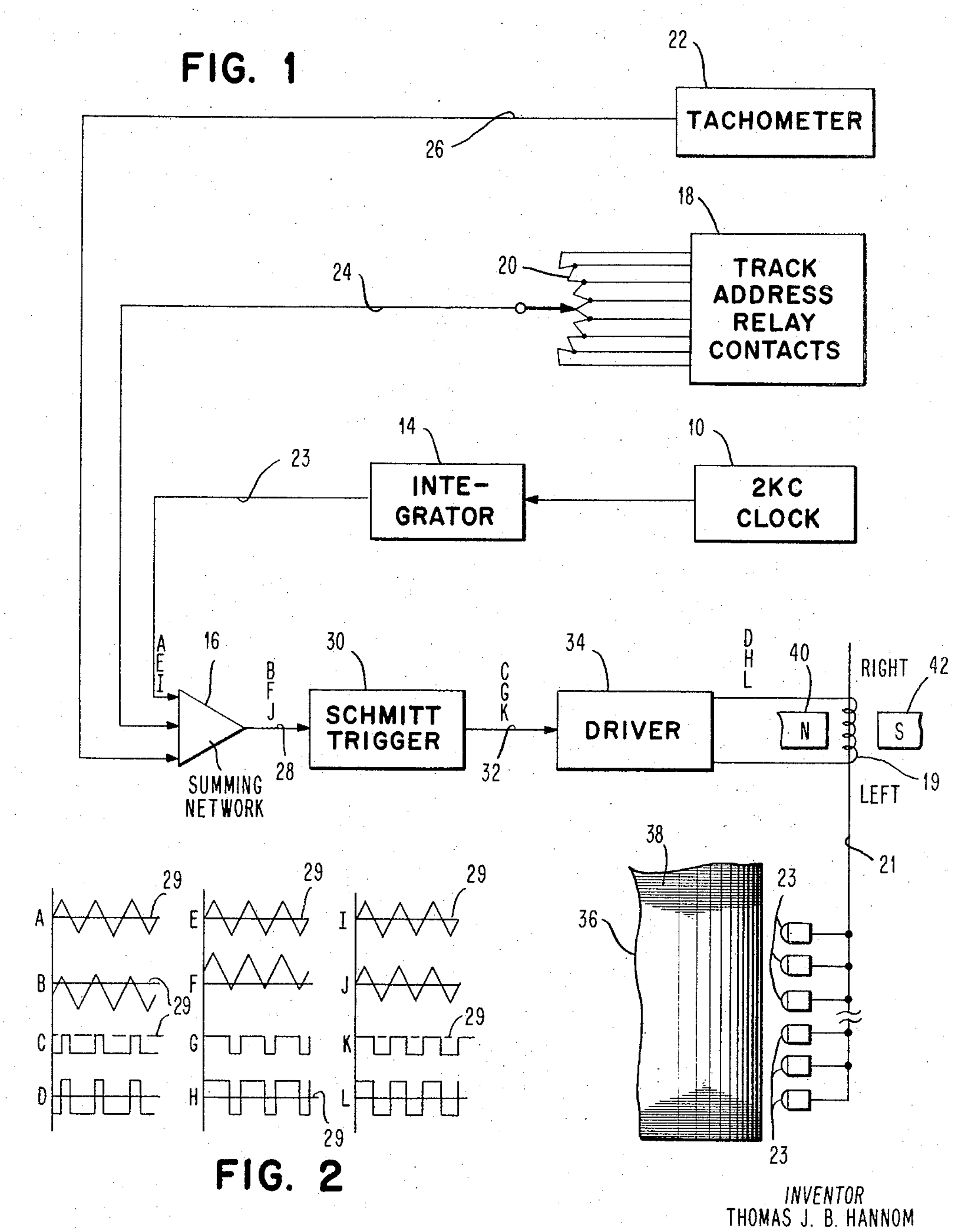
FIGURE 1 illustrates one embodiment of the present invention.
FIGURE 2 illustrates a series of waveforms shown for purposes of explanation.

Referring to the drawing, a system for positioning a plurality of magnetic heads over selected tracks on a recording medium, such as a magnetic drum, is illustrated.

In many positioning systems, servo mechanisms are employed to move a positioning element. In a computer system involving a magnetic drum, a magnetic read or write head is normally positioned over an information track having a designated address. If it is desired to move the magnetic head to a different position or address, an error positioning voltage is generally first developed and applied to a suitable servo mechanism to cause movement of the magnetic head to the new selected address. The error positioning voltage is generally the voltage representative of the difference between the actual position of the magnetic head and the position to which the magnetic head is to be moved. This error positioning voltage is generally derived from a comparison of a voltage representing the actual position of the magnetic head and a voltage representative of the position being sought by the magnetic head.

As the magnetic head moves from its previous address toward a new selected address, the error positioning voltage gradually diminishes until it reaches zero voltage, which indicates that the magnetic head is at its selected new address. All of these features relating to positioning a magnetic head are well known to those skilled in the art and therefore will not be shown or described in detail.

It is known in servo mechanism systems that as an element reaches its final position, it will tend to over-shoot. This tends to cause a certain amount of oscillation in the system. In order to minimize this effect, a velocity voltage, representative of the speed of movement of the magnetic head is generally developed. This velocity voltage acts as a damping voltage. Generally, the velocity voltage is a voltage of opposite polarity to the error positioning voltage. As the magnetic head approaches its final position the velocity voltage and the error positioning voltage, in combination, generally control the servo mechanism which moves the magnetic head. Again, such velocity voltages in combination with error positioning voltages are well known to those skilled in the art. The present invention utilizes the velocity and error positioning voltage in combination with a signal having substantially equal rising and falling slopes to achieve certain advantages in positioning magnetic heads where a high power control signal is needed for application to the prime mover associated with a servo system.

Referring to FIGURES 1 and 2, a square wave oscillator 10 produces an output signal which may, for example, have a so called clock frequency of two kilocycles. The oscillator 10 may be a toggle flip-flop circuit having an input signal of 4 kc. for example.

The output signal from the square wave oscillator circuit 10 is applied to an integrator circuit 14 to produce triangular wave signals, represented by waveform 2A of FIGURE 2. The output from the integrator circuit 14 is applied to a summing network 16. An error positioning voltage is developed within the track address relay contacts circuits 18. This error positioning voltage is applied from the potentiometer 20 to the summing network 16.

A velocity voltage is developed by a tachometer 22 and applied to the summing network 16. The tachometer 22 may be associated with a mechanical element which responds to the movement of the magnetic head.

In describing the system, in which the triangular shaped signals of the present invention are involved, three general situations will be considered. The first situation will involve the flow of current through the coil 19 in a first direction. The second situation will involve the flow of current in the coil 19 in a second or opposite direction. The third situation will involve a zero average current through the coil 19. The permanent magnet and coil arrangement shown is a schematic representation of an assembly which is similar in operation to an audio speaker as will be discussed in greater detail below.

The amplitude and direction of the current through the coil 19 controls the movement of a rod element 21 which, in turn, controls the movement of a plurality of magnetic heads 23, in a manner to be described.

In considering the first situation in which the current through the coil 19 is in a first direction, only the waveforms 2A, 2B, 2C and 2D need be considered. In all the waveforms considered, a line 29 will be considered as the bias level or point of reference potential. This level, for example, may be zero volts and points which cross this level may be referred to as the zero cross-over points.

Three different signals are applied from lines 23, 24 and 26 to the summing network 16. The signal applied to the line 23 is the triangular shaped signal illustrated in FIGURE 2 by waveform 2A. The error positioning signal and the velocity signals are applied through the lines 24 and 26, respectively, to the summing network 16.

When the combined and error velocity signal is in a first or negative direction and applied to the summing network 16, the triangular shaped signal, represented by waveform 2B, will be developed at the line 28. The negative portions of the triangular signal is greater than the positive portion with the signal at the line 28 being substantially the same in form as the signal 2A, except that it has dropped below the reference level 29.

The signal from the line 28, i.e. waveform 2B, is applied to a zero cross detector circuit, illustrated as being a Schmitt Trigger circuit 30. Zero cross detector circuits are well known to those skilled in the art. Such types of circuits are capable of detecting whenever an input signal crosses a point of reference potential, generally zero volts or ground. If the zero crossing point is crossed when an input signal is going in the positive direction, for example, the output signal from the Schmitt Trigger circuit 30 may change to a high level. Likewise, if the input signal, when passing through zero, is going in the negative direction, the output signal from the Schmitt Trigger circuit 30 may be switched from a high level to a low level.

Application of the signal 2B to the Schmitt Trigger circuit 30 results in a signal 2C being developed at the line 32 of the Schmitt Trigger circuit. The output signal from the line 32 is applied to the driver circuit 34. This driver circuit may be of the type shown and claimed in a copending application of David G. Adler, entitled Bi-Directional Current Driver, filed Feb. 20, 1963, Ser. No. 259,970, now abandoned, and assigned to the same assignee as the present invention. The output signal from the driver circuit, illustrated by waveform 2D is applied to the coil 19.

The magnetic field produced within the coil 19 is employed to move the magnetic rod 21, which may be metal or other suitable material. The rod 21 is connected to the plurality of magnetic heads 23, which are disposed to be moved or positioned over selected information tracks 36 of a magnetic drum 38, for example.

Because the negative portions of the signals of waveform 2D are greater than the positive portions of the signals, the negative portions will be applied to the coil 19 for a much longer time than the positive portions and consequently will control the direction of movement of the rod 21.

In the embodiment illustrated, the coil 19 is disposed between a pair of permanent magnetic elements 40 and 42. The elements 40 and 42, designated as North and South poles, respectively, produce a magnetic field through the coil 19. This magnetic field is substantially perpendicular to the magnetic field produced by the current flow through the coil 19. Consequently, two magnetic fields combine vectorially within the coil 19 during a positioning operation. Since the combined vector field is a function of the current through the coil 19, the coil 19 will tend to attract the rod 21 to be moved in a direction dependent upon the magnitude and direction of the total average current through the coil 19. In other words, the element 21 is in practice attached to a structural element (not shown) upon which the speaker cone of an audio speaker would normally be attached and around which the coil 19 is wound.

As mentioned above, signals such as waveform 2D, being predominantly negative, will tend to move the rod 21 in a first direction, for example to the left.

Let us now consider the second situation in which current flows through the coil 19 in the opposite direction to therefore cause the rod 21 to be moved in the opposite direction or to the right.

If it is desired to move the positioning rod 21 in the opposite direction, the combined error and velocity voltage applied to the lines 24 and 26 is positive thereby shifting the triangular signal with respect to the bias level 29 in the opposite or positive direction. In this case, the waveform 2E will produce a waveform 2F at the line 28. Also, the waveform 2G will be developed at the output circuit of the Schmitt Trigger 30 at the line 32. Waveform 2H from the driver circuit 34 is applied to the coil 19.

It is noted that waveform 2H is different than waveform 2D. In waveform 2H, the positive portions of the signal are greater than the negative portions of the signal. Consequently, the positive portions of the signal will control the current and magnetic field within the coil 19 to thereby control the direction and distance of movement of the positioning rod 19.

In the third situation involving no error or velocity signals, the waveform 2I will produce a substantially unchanged signal represented by 2J at the output line 28. A signal 2K will be developed by the Schmitt Trigger circuit at the output line 32. A waveform 2L will be developed across the coil 19.

It is noted in waveform 2L that both the positive and negative portions of the square wave signal are equal. The average current flow through the coil 19 is therefore zero. Consequently, no movement of the rod 19 will occur since the magnetic field produced by the current through the coil 19 is zero.

Because the rod 21 is a mechanical element having a certain amount of inertia, it is not capable of following the input electrical signal for each cycle of the applied signal but rather is responsive to the overall average signals applied thereto. Application of positive and negative signals of equal duration will therefore not produce any movement of the rod 21.

The triangular shaped signal utilized in practicing the present invention involves cycles in which both halves are of the same shape but of opposite polarity. It is noted that the upward slopes of the triangular signals are substantially equal to downward slopes. When the triangular signals are biased at their midpoints, the positive and negative portions of the signals are substantially equal. This makes it possible to easily provide a neutral position for a positioning element.

In some cases, the triangular signals may be limited, which may make either their tops or bottoms, or both, flat. However, even in these cases, the upward and downward slopes of the signals would be the same angular relationship and therefore still useful in practicing the present invention. The triangular signals may have slightly non linear rises and falls without affecting the operation of the invention. This feature has the advantage over the use of conventional saw tooth signals where slight distortions in the signals would result in faulty operation.

The embodiments of the invention in which an exclusive property or privilege is claimed are defined as follows:

1. A circuit for producing a bi-directional current through a driving element to position a transducer comprising a drive circuit having equal positive and negative output signal levels and being capable of changing said signal levels upon the application thereto of input signals crossing a predetermined reference potential in positive or negative directions, a source of triangular signals having substantially equal rising and falling slopes, said last named signals being normally biased at said reference potential so as to normally have equal positive and negative portions, a source of velocity signals, means for applying said last named signals to said drive circuit to normally produce square wave output signals of equal positive and negative levels, and means including said velocity signals for shifting the bias level of said signals of equal rising and falling slopes to produce output signals of variable widths at said drive circuit whereby said transducer is moved in one or two directions dependent upon the predominating polarity of said signals of equal rising and falling slopes.

2. A circuit for producing driving current through a coil for positioning a magnetic transducer comprising a drive circuit having two output signal levels and being capable of changing its output signal level whenever input signals applied thereto cross a level of a predetermined reference potential in positive or negative directions, a source of linear rise and fall triangular signals normally biased at said reference potential so as to normally have equal positive and negative portions, a source of velocity signals, means for applying said linear signals to said drive circuit to normally produce output signals thereat of equal positive and negative levels, and means including said velocity signals for shifting the bias level of said linear signals to produce output signals of variable widths at said drive circuit.

3. A circuit for translating variable amplitude signals into corresponding pulse width modulated signals comprising a rectangular wave generator which changes operating states each time a signal passing through a reference potential is applied thereto, a source of triangular signals having equal positive and negative portions with respect to said reference potential, a source of velocity voltage signals, means for utilizing said variable amplitude signals including said velocity voltage signals to cause said triangular signals to have unequal positive and negative portions with respect to said reference potential, and means for applying said triangular signals to said rectangular wave generator to produce rectangular wave signals variable in width in accordance with the amplitude of said variable amplitude signals.

4. A circuit for converting variable amplitude signals into corresponding pulse width modulated signals comprising a zero cross detector circuit capable of assuming high or low output states depending upon its input signal, a source of triangular signals, means for normally biasing said triangular signals at zero potential whereby substantially equal positive and negative signal cycles are provided, a source of variable amplitude signals, including a source of velocity signals means for utilizing said variable amplitude signals to shift said triangular signals with respect to said zero potential, and means for applying said triangular signals to said zero cross detector circuit to produce a rectangular shaped electrical signal corresponding in width to said variable amplitude signals.

5. A system for positioning a magnetic transducer over selected tracks of a magnetic recording medium comprising a source of velocity signals, a source of error positioning signals, a source of triangular signals having linear rise and fall portions, said signals being normally variable equally about a fixed reference potential, a summing circuit, means for applying said velocity, error positioning and signals with linear rise and fall portions to said summing circuit to produce output signals having linear rise and fall portions which are variable unequally about said reference potential with the amplitude and direction of the unequality being dependent upon the amplitude and polarity of the combined velocity and error positioning signals, a rectangular signal wave generator adapted to change its output signal levels whenever an applied signal thereto crosses said reference potential, and means for applying said signals from said summing circuit to produce signals of variable widths corresponding to the inequality of said signals from said summing circuit.

6. A system for positioning a magnetic transducer over selected tracks of a magnetic to recording medium comprising a source of velocity signals representative of the velocity of said magnetic transducer during a positioning operation, a source of error positioning signals representative of the difference between the location of said transducer during a positioning operation and the address location being sought by said transducer during said positioning operation, a source of triangular shaped signals normally variable equally about a fixed reference potential, a summing circuit, means for applying said velocity, error positioning and triangular shaped signals to said summing circuit to produce output triangular signals variable unequally about said reference potential, with the amplitude and polarity of the unequality being dependent upon the amplitude and polarity of the combined velocity and error positioning signals, a rectangular signal wave generator adapted to change its output signal levels whenever an applied signal thereto crosses said reference potential, and means for applying said triangular shaped signals from said summing circuit to produce signals of variable widths corresponding to the inequality of said triangular shaped signals from said summing circuit.

7. A system for positioning a magnetic transducer over a magnetic recording medium comprising: a magnetic coil, a permanent magnet having a North and South pole positioned in juxtaposition to said magnetic coil to generate a magnetic field which interacts with the field generated when said magnetic coil is energized, means arranged for positioning with respect to said magnetic recording medium, and further arranged with respect to said coil to move in a direction which is the result of the interaction of the field of said permanent magnet and said energized coil, said transducer being connected to said last mentioned means, a source of velocity signals representative of the velocity of said magnetic transducer during a positioning operation, a source of error signals representative of the differences between the location of said transducer and the new location being sought by said transducer during a positioning operation, a source of triangular shaped signals normally variable equally about a fixed reference potential, a summing circuit, means for applying said velocity, error and triangular shaped signals to said summing circuit to produce output triangular signals variable unequally about said reference potential, with the amplitude and polarity of the unequality being dependent upon the amplitude and polarity of the combined velocity and error signals, a rectangular signal wave generator adapted to change its output signal levels whenever an applied signal thereto crosses said reference potential, and means for applying said triangular shaped signals from said summing circuit to produce signals of variable widths corresponding to the inequality of said signals from said summing circuit, bi-directional current means, the output thereof being connected to said magnetic coil and the input being connected to the output of said rectangular signal wave generator, current being conducted through said magnetic coil in a first or second direction in accordance with said variable width signal which interact with the magnetic field generated by said permanent magnet, said means arranged with respect to said magnetic coil being correspondingly moved in a first or second direction to thereby position said transducer with respect to said magnetic recording medium.

8. The system in accordance with claim 7 wherein said source of error signals comprises the difference between the present track location on said recording medium and the desired new track location.

9. A system for positioning a magnetic transducer over selected tracks of a magnetic recording medium comprising, a source of velocity signals, a source of track error signals independent of said recording medium, said track error signals being representative of the difference between the present track location of said transducer and the desired track location, a source of triangular signals having linear rise and fall portions, said signals being normally variable equally about a fixed reference potential, an analog summing circuit, means for applying said velocity, track error and triangular signals to said summing circuit to produce output signals having linear rise and fall portions which are variable unequally about said reference potential with the amplitude and direction of the unequality being dependent upon the amplitude and polarity of the combined velocity and track signals, a rectangular signal wave generator adapted to change its output signal levels whenever an applied signal thereto crosses said reference potential, and means for applying said signals from said summing circuit to produce signals of variable widths corresponding to the inequality of said signals from said summing circuit.

10. A system for positioning a magnetic transducer over selected tracks of a magnetic recording medium comprising, a source of velocity signals, a source of track error signals independent of said recording medium, said track error signals being representative of the difference between the present track location of said transducer and the desired track location, a source of triangular signals having linear rise and fall portions, said signals being normally variable equally about a fixed reference potential and further said signals being independent of said recording medium, an analog summing circuit, means for applying said velocity, track error and triangular signals to said summing circuit to produce output signals having linear rise and fall portions which are variable unequally about said reference potential with the amplitude and direction of the inequality being dependent upon the amplitude and polarity of the combined velocity and track error signals, a rectangular signal wave generator adapted to change its output signal levels wherever an applied signal thereto crosses said reference potential, and means for applying said signal from said summing circuit to produce signals of variable widths corresponding to the inequality of said signals from said summing circuit.

References Cited

UNITED STATES PATENTS

| | | | |
|---|---|---|---|
| 3,175,205 | 3/1965 | Auyang ---------- | 340—174.1 |
| 3,209,338 | 9/1965 | Romuari ---------- | 340—174.1 |
| 3,229,270 | 1/1966 | Rosenblatt -------- | 340—174.1 |

BERNARD KONICK, *Primary Examiner.*

V. P. CANNEY, *Assistant Examiner.*